United States Patent [11] 3,609,093

| [72] | Inventor | Larry A. Harrah<br>Albuquerque, N. Mex. |
|---|---|---|
| [21] | Appl. No. | 758,959 |
| [22] | Filed | Sept. 11, 1968 |
| [45] | Patented | Sept. 28, 1971 |
| [73] | Assignee | The United States of America as represented by the United States Atomic Energy Commission |

[54] PHOTOCHROMIC RADIATION DOSIMETER
5 Claims, 4 Drawing Figs.

| [52] | U.S. Cl. | 252/300, 260/390 |
|---|---|---|
| [51] | Int. Cl. | G02c 7/10, G02b 5/20 |
| [50] | Field of Search | 96/1.5 |

[56] References Cited
UNITED STATES PATENTS

| 3,310,401 | 3/1967 | Greig | 96/1.5 |
|---|---|---|---|
| 3,287,121 | 11/1966 | Hoeel | 96/1.5 |
| 3,274,000 | 9/1966 | Noe | 96/1.5 |
| 3,155,503 | 11/1964 | Caisiers | 96/1.5 |
| 3,140,948 | 7/1964 | Steward et al. | 96/1.5 |

OTHER REFERENCES

Brewster, Organic Chemistry, 1953 Second Edition pp. 726–728

*Primary Examiner*—George F. Lesmes
*Assistant Examiner*—J. P. Brammer
*Attorney*—Roland A. Anderson ABSTRACT: A photochromic radiation dosimeter comprising a homogeneous mixture of a poly(halostyrene) host and a compound selected from the general structure of triarylmethane carbinols, ethers or azides substituted in one or more of the aryl moieties with hydroxyl or amine auxo-chromes.

INVENTOR.
Larry A. Harrah
BY

PHOTOCHROMIC RADIATION DOSIMETER

BACKGROUND OF INVENTION

Many different types of radiation detectors or radiation-sensitive materials are used to measure ultraviolet and ionizing radiation exposures of personnel in radiation fields or to map or measure the radiation fields emitted from conventional radiation sources. One type of radiation-sensitive material commonly used to measure radiation dose is photosensitive films, typically photographic films. A suitably calibrated film prepared by carefully controlled methods may show by the amount of coloring or blackening, the dose of ionizing radiation to which it has been exposed. The film may also provide an estimate of the radiation spectrum to which it has been subjected, or detect the presence of Beta particles, when used with suitable types and thicknesses of filters. Many prior photosensitive films include complex formulations of dyes, activators and carriers, some of which may not provide a uniform radiation dose measurement over the entire film area or over varying dose rates and which may be highly sensitive to environmental conditions.

Another type of photosensitive material included liquid formulations of radiation sensitive dyes in solvents which must be held in suitable radiation insensitive containers. Many of these materials quickly reverse or return to their original coloration or state upon being removed from a radiation field.

SUMMARY OF INVENTION

In view of the limitations of the prior art as noted above, it is an object of this invention to provide a photochromic dosimeter capable of measuring a wide dynamic range of radiation doses.

It is a further object of this invention to provide a photochromic dosimetric material having a new, homogeneous formulation.

It is a further object of this invention to provide a photochromic formulation whose response is independent of dose rate.

It is a further object of this invention to provide a photochromic dosimeter which is highly stable under normal environmental conditions.

Various other objects and advantages will appear from the following description of embodiments of the invention, and the most novel features will be particularly pointed out hereinafter in connection with the appended claims.

The invention comprises a photochromic dosimeter made of a homogeneous mixture of a poly(halostyrene) and triarylmethane carbinols, ethers, or azides substituted in one or more of the aryl moieties with hydroxyl or amine auxochromes.

DESCRIPTION OF DRAWINGS

Some of the characteristics of the photochromic materials of the present invention are shown in the drawings wherein.

DETAILED DESCRIPTION

Figure 1:
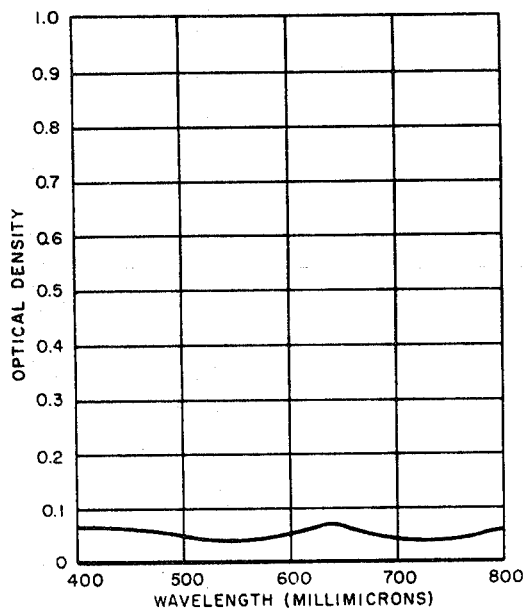
FIG. 1 is a graph of optical density over the visible spectrum of an unexposed photochromic formulation.

It has been found that certain normally colorless triarylmethane carbinols, ethers, or triarylmethane azides substituted in one or more of the aryl moieties with hydroxyl or amine auxo-chromes when homogeneously mixed with a poly(halostyrene) host in prescribed proportions are converted to permanently colored dyes under the influence of ultraviolet and ionizing radiation having an optical density proportional to the dose irrespective of dose rate with a uniform response through out the dosimeter material.

The normally colorless or leuco dye base having the desired properties may be described by the general formula;

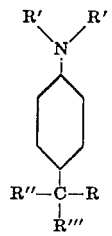

wherein R is a substituent selected from the group consisting of OH, O-$R_1$ ($R_1$=$CH_3$ or $C_2H_5$) and $N_3$; R' is a substituent selected from the group consisting of aryls, alkyls, alkoxyl and hydrogen; R" is selected from the group consisting of phenyls, α-naphthyls, amino-phenyls, hydroxy phenyl and hydrogen; and R''' is a hydrocarbon selected from the group consisting of phenyls, α-naphthyls, hydroxy phenyl and amino-phenyls. In certain instances dyes containing hydroxyl substituted for NR'$_2$ substituents exhibit the required properties. Typical dye bases which may be used for imaging ionizing radiation and in some instances ultraviolet radiation and even visible blue light include malachite green carbinol, victoria blue B carbinol, crystal violet carbinol, methyl ether, auramine carbinol, malachite green azide and other conventional carbinol and their equivalent azide or ether dye compounds.

Various leuco dye bases which exhibit the desired properties under the influence of radiation may be described by the following formulas;

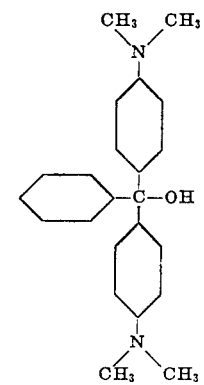

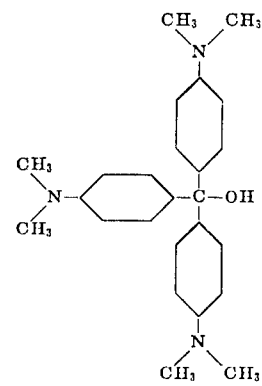

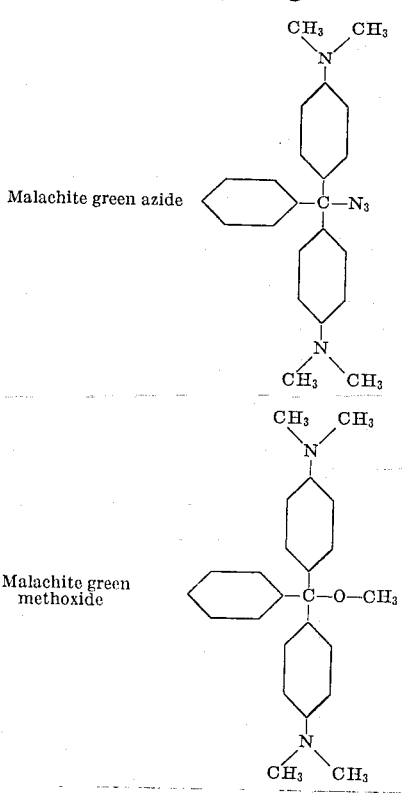

Each of the above leuco dye bases of triarylmethane carbinols, ether or azide may exhibit a change in chemical composition when subjected to certain radiations and admixed with a suitable poly(halostyrene) host. The poly(halostyrene) host provides both a colorless carrier for supporting the dye base and an activator for enhancing the dye compound formation and consequently color formation in a radiation field. Suitable hosts include poly(3 chlorostyrene), poly(4 chlorostyrene), poly(4 bromostyrene), poly(4 iodostyrene) and poly(2,5 dichlorostyrene).

The film dosimeter may be formed by mixing suitable proportions by weight of the poly(halostyrene) host and triarylmethane dye base in a solvent such as benzene or toluene to a homogeneous blend or mixture. The homogeneous mixture may then be cast or formed by any conventional solution casting technique into uniform thickness film. The solvent is evaporated and the remaining solid homogeneous film rolled, extruded or biaxially oriented to obtain desired film thickness and mechanical properties and the film then subjected to a radiation field.

It has been found that the leuco dye base mixed with a poly(halostyrene) host at between about 0.1 to 10 percent by weight of the host, preferably about 1 percent, will provide the desired radiation dose measurements under most conditions. Dye base percentages above 1 percent permit higher dose measurements but may be more sensitive to environmental conditions such as acid vapors. Using these materials and weight percentages, the optical density of the dosimeter film at the characteristic wavelength of the particular dye used increases linearly with increasing dose regardless of dose rate.

In order to provide uniform dose measurements over the area of the film dosimeter, the thickness should preferably be controlled within ±10 percent. For most applications, limited at the low end primarily by forming techniques, the film may be from about 2–7 mils or more in thickness. To provide accurate dose measurements with uniform exposure through a given film thickness, the film generally should not absorb more than a small friction of the radiation impinging thereon. For instance the minimum measurable dose for a 3 mil film is about 5,000 rads. It will be apparent that radiation energy may also be determined by subjecting different thicknesses or multilayered films of preselected thickness to an unknown radiation field and comparing the optical densities of the various dosimeter films. As film thickness increases, the sensitivity or response per unit dose increases.

Certain hydrocarbons may be added to the homogeneous dye base and host mixture in suitable proportions to reduce the sensitivity of a given film dosimeter formulation. For example, it has been discovered that either anthracene or phenanthrene, or homologs or isomer thereof, when added in quantities of about 0.1 to 5 percent by weight of the host extend the upper range of measurable dose in a given film thickness and formulation.

Metal organic compounds soluble in the polystyrene host may be added in small amounts to increase the spectral sensitivity of the dye base at certain radiation energies. Such compounds include tetraphenylstannane, copper-acetylacetonate, and bismuth triphenyl. Spectral sensitivities of a given dye base have been changed by using bismuth triphenyl at about 10 to 16 percent bismuth by weight of the host.

Figure 2:
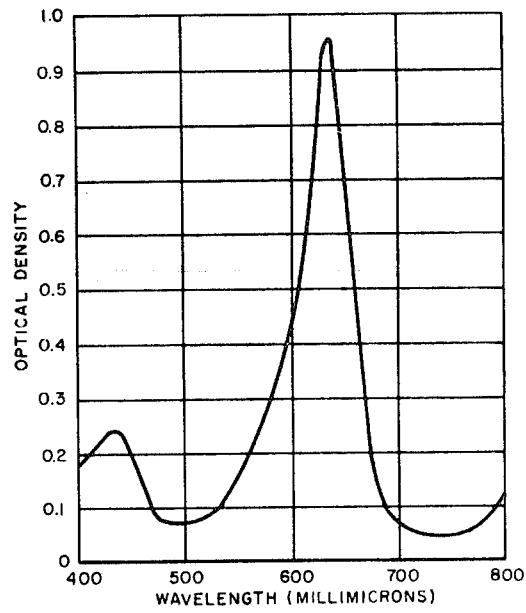
FIG. 2 is a graph of optical density over the visible spectrum of the photochromic formulation shown in FIG. 1 which was exposed to a radiation dose.
Figure 3:
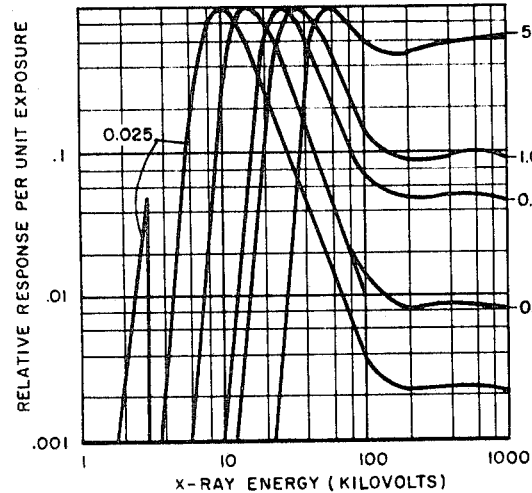
FIG. 3 is a log-log graph of relative response vs. X-ray energy for films of different thickness made of the same formulation as FIGS. 1 and 2.

The film dosimeter may be read by use of conventional optical density measuring techniques such as with a spectrophotometer. FIG. 1 shows the generally uniform optical density of an unexposed film made of a homogeneous mixture of poly(3 chlorostyrene)-malachite green carbinol having a thickness of about 2.0 mils over the spectral range of the photometer. FIG. 2 shows the double peaked permanent coloration response curve at 430 and 628 millimicrons for the same film mixture having a thickness of about 2.9 mils and irradiated by a cobalt 60 source with a total dose of about $0.424 \times **0^6$ rads. A double-peaked response curve may be used to measure a wider range of dose with a given film thickness by using the more sensitive higher spectral response peak at low doses and the less sensitive lower spectral response peak at high doses. FIG. 3 illustrates the effect of film thickness for the same film mixture where the thickness is given in grams/square centimeter. The 5 gram/square centimeter film corresponds to a film about 1,600 mils thick.

In the film mixtures for the film dosimeters used for the measurements shown in FIGS. 1 through 3, the dye base was in the proportion of about 1 percent by weight of the host. No measurable dose rate effects were observed when similar films were irradiated at dose rates varying from 270 rads/second to $6.7 \times 10^{13}$ rads/second using cobalt 60 gamma radiation and 2 MeV peak electrons.

Figure 4:
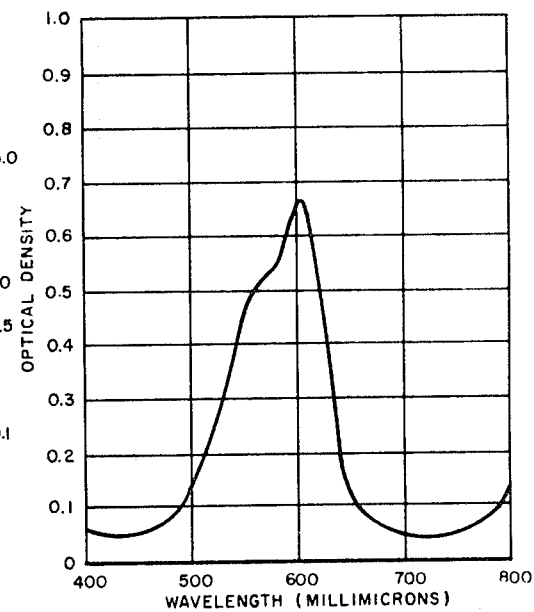
FIG. 4 is a graph of optical density over the visible spectrum of another photochromic formulation which was exposed to a radiation dose.

FIG. 4 shows the peaked permanent coloration response curve at about 600 millimicrons of a poly(4 bromostyrene)-crystal violet carbinol homogenous mixture in a film about 5 mils thick which was irradiated by a cobalt 60 source by a dose of about $0.196 \times 10^5$ rads.

The azide and ether dye bases generally have the same spectral response as their corresponding carbinol dye base with an improved energy response. For instance, malachite green methoxide and malachite green azide give bands at 628 and 430 millimicrons when exposed in the poly(4 chlorostyrene) host, indistinguishable from malachite green carbinol but with different energy response.

The dye bases noted above may also be used to measure radiation dose with either permanent or reversible coloration changes in the liquid form with suitable solvents. For example, permanent photocoloration has been obtained in highly polar or reactive solvents such as acetonitrile, chloroform or dimethylformamide.

These dye base-poly(halostyrene) mixture films may be used to quantitatively or qualitatively measure radiation doses over a wide region of the radiation spectrum from energies of about 2,000 electron volts to greater than about 2 million electron volts with either an immediate or delayed response indicated by permanent coloration of the film to an optical density proportional to dose. Irradiated or unirradiated films have been stored for appreciable periods of time without any degradation of the film or any coloration of the film when protected from radiation in the storage region. The film mixture may be readily prepared and formed into any desired film configuration having any desired film thickness and uniform response over the entire film area.

It will be understood that various changes in the details and materials which have been herein described and illustrated in order to explain the nature of the invention, may be made by those skilled in the art within the principles and scope of the invention as expressed in the appended claims.

What is claimed is:

1. A photochromic radiation film dosimeter comprising a homogeneous mixture of a colorless poly(halostyrene) host carrier and activator and a base of a leuco dye convertible by to radiation to a corresponding colored dye in said colorless host with an optical density linearly proportional solely to dose of said radiation, said leuco dye with the proportion of from about 0.1 to 10 percent weight of said host having the general formula

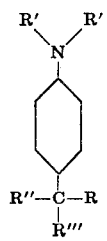

wherein $R$ is a substituent selected from the group consisting of OH, $OCH_3$, $OC_2H_5$ $N_3$; $R'$ is a substituent selected from the group consisting of aryls, alkyls, alkoxyl and hydrogen; $R''$ is a substituent selected from the group consisting of phenyls, $\alpha$-naphthyls amino-phenyls, hydroxy phenyl and hydrogen; and $R'''$ is a hydrocarbon selected from the group consisting of phenyls, $\alpha$-naphthyls, amino-phenyls and hydroxy phenyl.

2. The dosimeter of claim 1 wherein said host is selected from the group consisting of poly(3 chlorostyrene), poly(4 chlorostyrene), poly(4 bromostyrene), poly(4 iodostyrene) and poly(2,5 dichlorostyrene).

3. The dosimeter of claim 1 wherein said mixture includes a metal organic compound soluble in said host to vary the spectral sensitivity of said dye base.

4. The dosimeter of claim 3 wherein said metal organic compound is selected from the group consisting of tetraphenylstannane, copper acetylacetonate and triphenyl bismuth.

5. The dosimeter of claim 1 wherein said mixture includes a hydrocarbon selected from the group consisting of anthracene and phenanthrene.